(12) United States Patent
Zeno (10) Patent No.: US 6,405,841 B1
(45) Date of Patent: Jun. 18, 2002

(54) ELECTROMAGNETIC SHOCK ABSORBER

(76) Inventor: Damon R. Zeno, 662 Delafield Ave., Staten Island, NY (US) 10301

( * ) Notice: Subject to any disclaimer, the term of this patent is extended or adjusted under 35 U.S.C. 154(b) by 0 days.

(21) Appl. No.: 09/663,123

(22) Filed: Sep. 15, 2000

(51) Int. Cl.[7] ............................................... F16F 15/03
(52) U.S. Cl. ........................ 188/267; 267/150; 280/5.5
(58) Field of Search .............................. 188/267, 267.2, 188/266.2; 267/150; 280/5.5

(56) References Cited

U.S. PATENT DOCUMENTS

| | | |
|---|---|---|
| D200,572 S | 3/1965 | Gordon |
| 3,770,290 A * | 11/1973 | Bottalico ............. 280/106.5 R |
| 3,941,402 A | 3/1976 | Yankowski et al. |
| 4,314,623 A * | 2/1982 | Kurokawa ................... 188/267 |
| 4,724,923 A * | 2/1988 | Waterman ................... 181/208 |
| 4,892,328 A | 1/1990 | Kurtzman et al. |
| 4,893,699 A | 1/1990 | Engelsdorf et al. |
| 4,900,054 A | 2/1990 | Kessler |
| 5,120,030 A * | 6/1992 | Lin et al. .................... 267/120 |
| 5,283,234 A * | 2/1994 | Wang et al. .................... 505/1 |
| 5,303,804 A | 4/1994 | Spiess |
| 5,346,192 A * | 9/1994 | Weltin et al. .......... 267/140.14 |
| 5,584,367 A * | 12/1996 | Berdut ........................ 188/267 |

FOREIGN PATENT DOCUMENTS

| | | | |
|---|---|---|---|
| JP | 401003338 A | * | 1/1989 |
| JP | 404203635 A | * | 7/1992 |
| JP | 406050374 A | * | 2/1994 |

\* cited by examiner

Primary Examiner—Paul N. Dickson
Assistant Examiner—Xuan Lan Nguyen (57) ABSTRACT

An electromagnetic shock absorber for dampening the vertical physical movement transferred from the wheel assembly of a vehicle to the frame assembly of the vehicle. The electromagnetic shock absorber includes a housing with a perimeter wall extending between a first end portion and a second end portion, a first electromagnetic assembly positioned within the housing and coupled to the first end portion of the housing, a second electromagnetic assembly positioned within the housing and coupled to the second end portion of the housing, a rod assembly with a first portion being slideably positionable in the housing, and a moving electromagnetic assembly coupled to a first end of the first portion and positioned between the first electromagnetic assembly and the second electromagnetic assembly within the housing.

16 Claims, 3 Drawing Sheets

ELECTROMAGNETIC SHOCK ABSORBER

BACKGROUND OF THE INVENTION

1. Field of the Invention

The present invention relates to shock absorbers and more particularly pertains to a new electromagnetic shock absorber for dampening the vertical physical movement transferred from the wheel assembly of a vehicle to the frame assembly of the vehicle.

2. Description of the Prior Art

The use of shock absorbers is known in the prior art. More specifically, shock absorbers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,303,804; 4,893,699; 3,941,402; 4,892,328; 4,900,054; and U.S. Pat. No. Des. 207,572.

While these devices fulfill their respective, particular objectives and requirements, the aforementioned patents do not disclose a new electromagnetic shock absorber. The inventive device includes a housing with a perimeter wall extending between a first end portion and a second end portion, a first electromagnetic assembly positioned within the housing and coupled to the first end portion of the housing, a second electromagnetic assembly positioned within the housing and coupled to the second end portion of the housing, a rod assembly with a first portion being slideably positionable in the housing, and a moving electromagnetic assembly coupled to a first end of the first portion and positioned between the first electromagnetic assembly and the second electromagnetic assembly within the housing.

In these respects, the electromagnetic shock absorber according to the present invention substantially departs from the conventional concepts and designs of the prior art, and in so doing provides an apparatus primarily developed for the purpose of dampening the vertical physical movement transferred from the wheel assembly of a vehicle to the frame assembly of the vehicle.

SUMMARY OF THE INVENTION

In view of the foregoing disadvantages inherent in the known types of shock absorbers now present in the prior art, the present invention provides a new electromagnetic shock absorber construction wherein the same can be utilized for dampening the vertical physical movement transferred from the wheel assembly of a vehicle to the frame assembly of the vehicle The general purpose of the present invention, which will be described subsequently in greater detail, is to provide a new electromagnetic shock absorber apparatus and method which has many of the advantages of the shock absorbers mentioned heretofore and many novel features that result in a new electromagnetic shock absorber which is not anticipated, rendered obvious, suggested, or even implied by any of the prior art shock absorbers, either alone or in any combination thereof.

To attain this, the present invention generally comprises a housing with a perimeter wall extending between a first end portion and a second end portion, a first electromagnetic assembly positioned within the housing and coupled to the first end portion of the housing, a second electromagnetic assembly positioned within the housing and coupled to the second end portion of the housing, a rod assembly with a first portion being slideably positionable in the housing, and a moving electromagnetic assembly coupled to a first end of the first portion and positioned between the first electromagnetic assembly and the second electromagnetic assembly within the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electromagnetic shock absorber apparatus and method which has many of the advantages of the shock absorbers mentioned heretofore and many novel features that result in a new electromagnetic shock absorber which is not anticipated, rendered obvious, suggested, or even implied by any of the prior art shock absorbers, either alone or in any combination thereof.

It is another object of the present invention to provide a new electromagnetic shock absorber which may be easily and efficiently manufactured and marketed.

It is a further object of the present invention to provide a new electromagnetic shock absorber which is of a durable and reliable construction.

An even further object of the present invention is to provide a new electromagnetic shock absorber which is susceptible of a low cost of manufacture with regard to both materials and labor, and which accordingly is then susceptible of low prices of sale to the consuming public, thereby making such electromagnetic shock absorber economically available to the buying public.

Still yet another object of the present invention is to provide a new electromagnetic shock absorber which provides in the apparatuses and methods of the prior art some of the advantages thereof, while simultaneously overcoming some of the disadvantages normally associated therewith.

Still another object of the present invention is to provide a new electromagnetic shock absorber for dampening the vertical physical movement transferred from the wheel assembly of a vehicle to the frame assembly of the vehicle.

Yet another object of the present invention is to provide a new electromagnetic shock absorber which includes a housing with a perimeter wall extending between a first end portion and a second end portion, a first electromagnetic assembly positioned within the housing and coupled to the first end portion of the housing, a second electromagnetic assembly positioned within the housing and coupled to the second end portion of the housing, a rod assembly with a first portion being slideably positionable in the housing, and a moving electromagnetic assembly coupled to a first end of the first portion and positioned between the first electromagnetic assembly and the second electromagnetic assembly within the housing.

Still yet another object of the present invention is to provide a new electromagnetic shock absorber that can be retrofitted to existing vehicles.

Even still another object of the present invention is to provide a new electromagnetic shock absorber that provides enhanced performance over conventional shock absorbers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
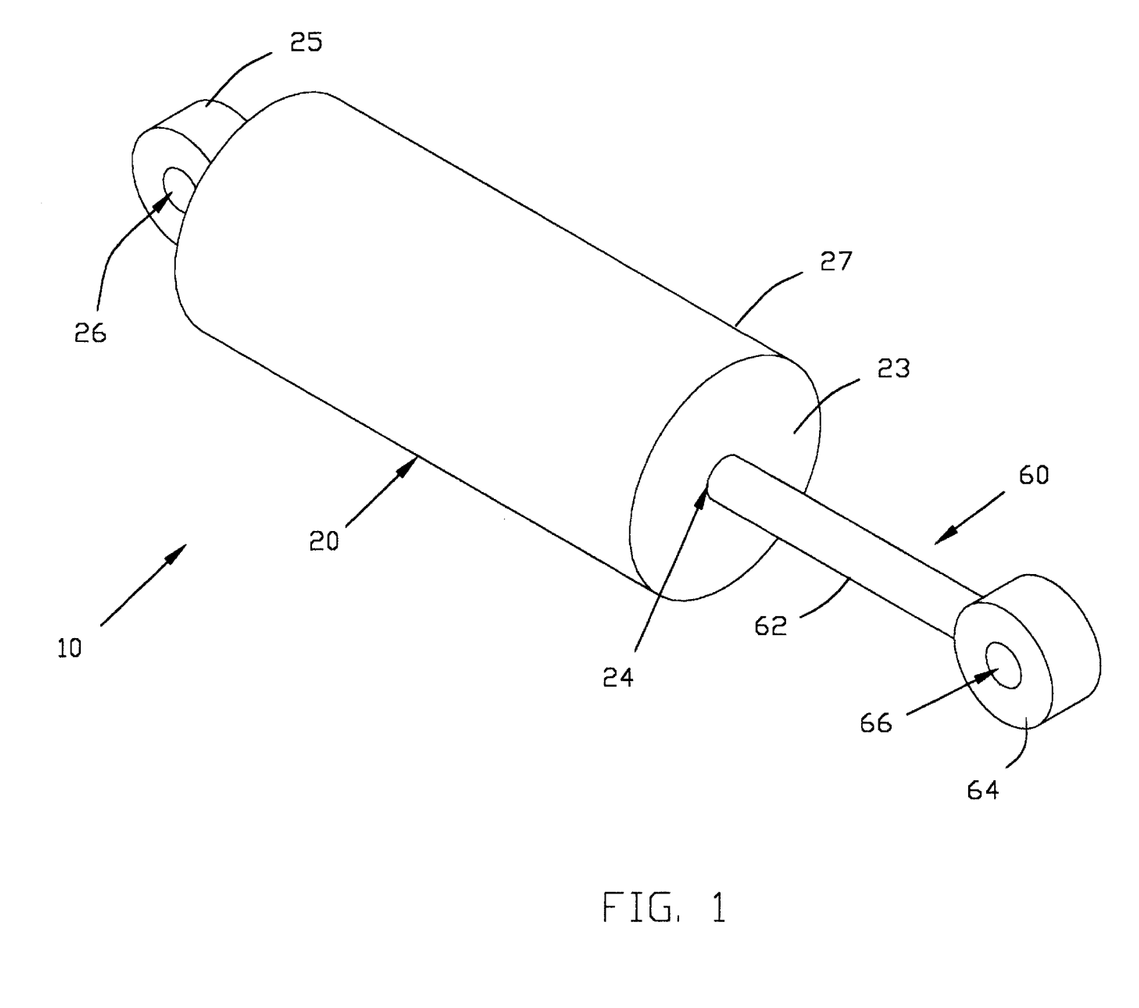
FIG. 1 is schematic perspective view of a new electromagnetic shock absorber according to the present invention.
Figure 2:
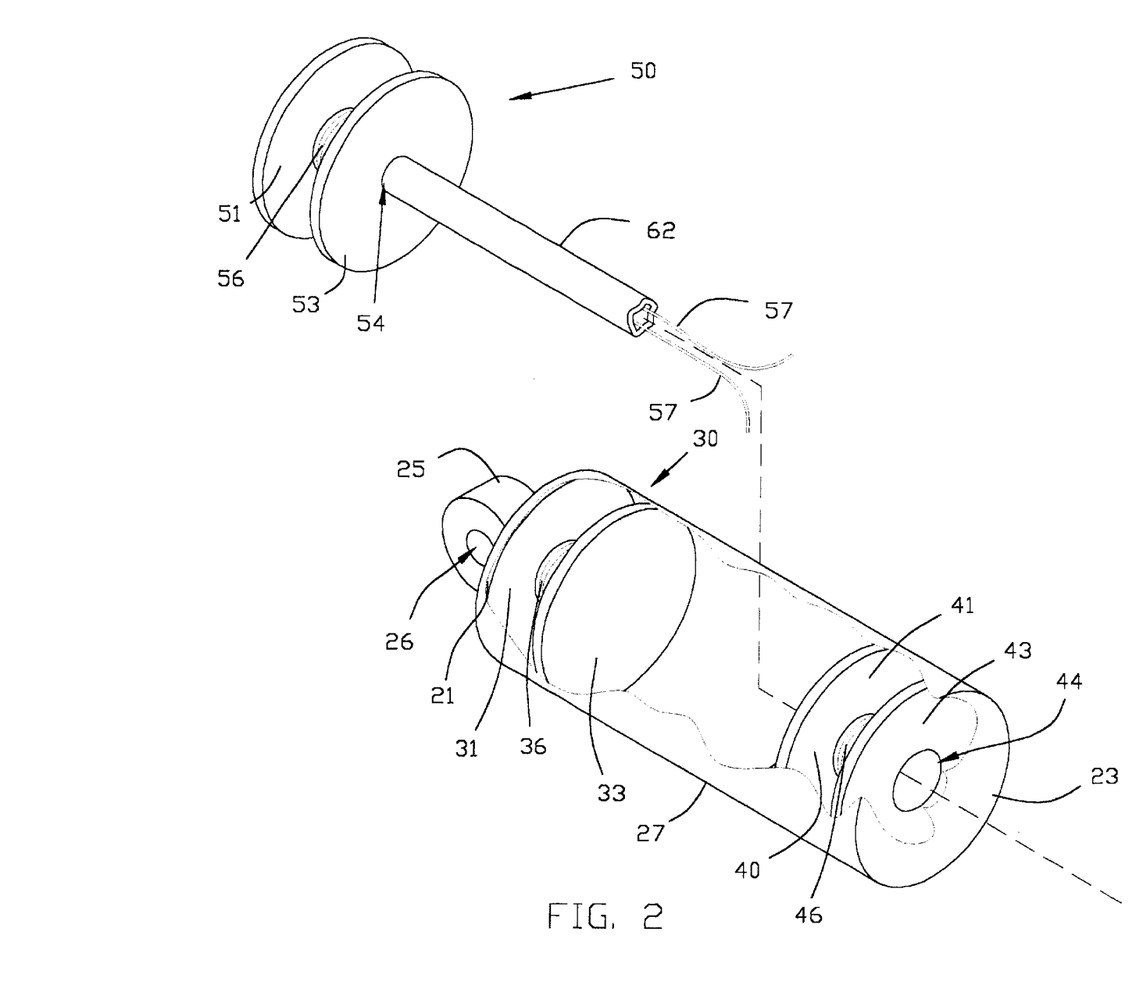
FIG. 2 is a schematic perspective exploded view of the present invention.
Figure 3:
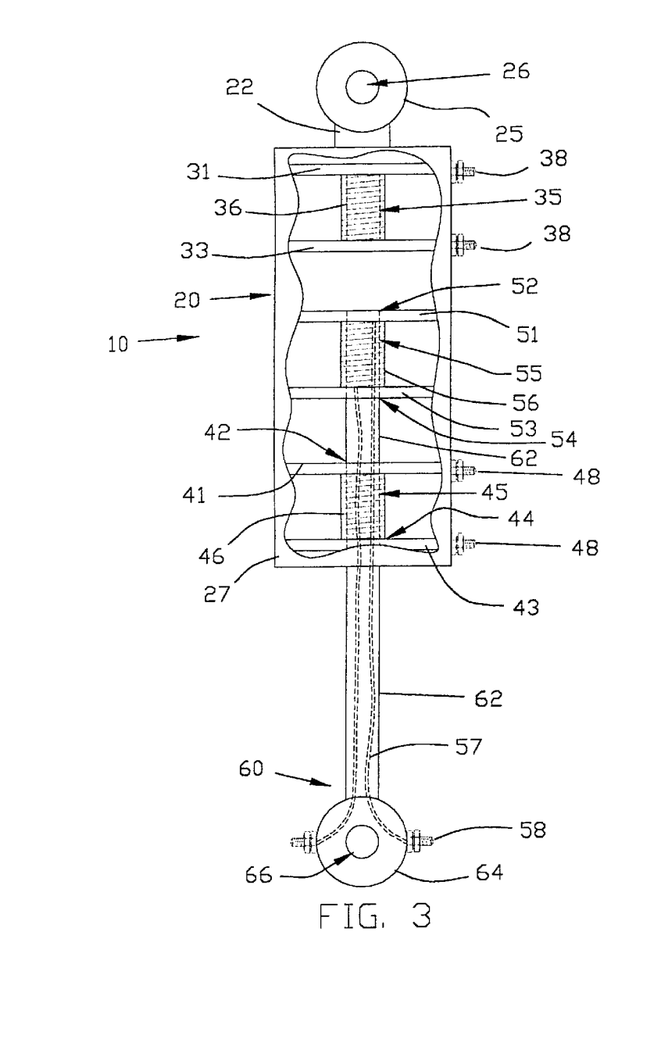
FIG. 3 is a schematic cross-section view of the present invention.
Figure 4:
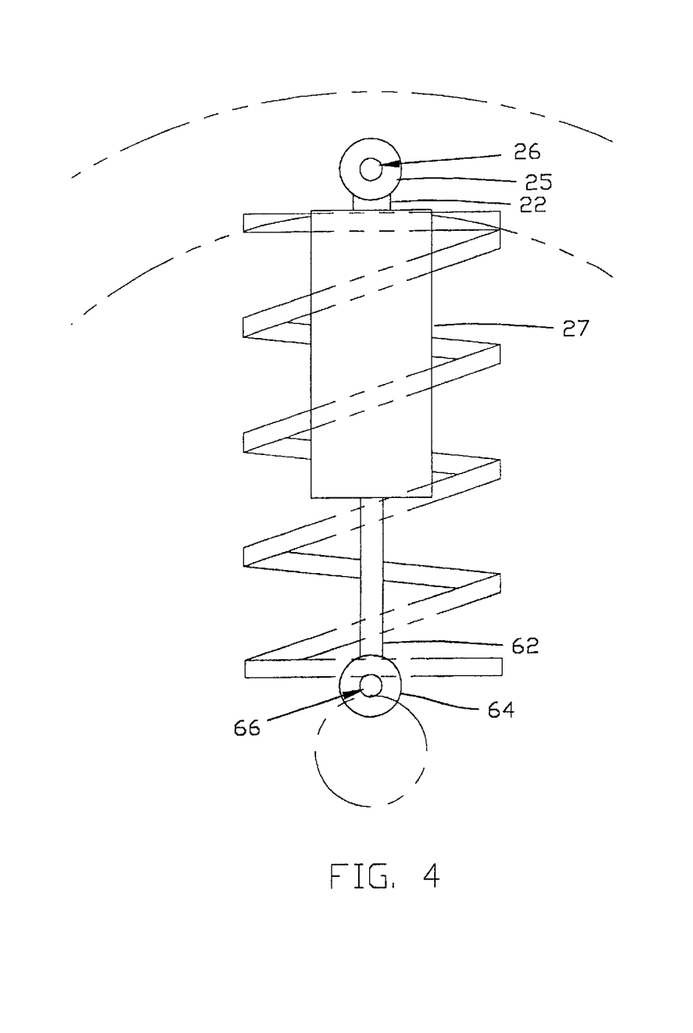
FIG. 4 is a schematic front view of the present invention in use.

With reference now to the drawings, and in particular to FIGS. 1 through 4 thereof, a new electromagnetic shock absorber embodying the principles and concepts of the present invention and generally designated by the reference numeral 10 will be described.

As best illustrated in FIGS. 1 through 4, the electromagnetic shock absorber 10 generally comprises an housing 20, a first electromagnet assembly 30, a second electromagnet assembly 40, a moving electromagnet assembly 50, and a rod assembly 60.

The housing 20 includes a first end portion 21 and a second end portion 23. The housing 20 includes a perimeter wall 27, which extends from the first end portion 21 to the second end portion 23. The second end portion 23 includes a rod aperture 24, which extends through the second end portion 23.

The first electromagnet assembly 30 is positioned within an interior of the housing 20 defined by the first 21 and second end portions 23 and the perimeter wall 27 of the housing 20. The first electromagnet assembly 30 is positioned adjacent the first end portion 21 of the housing 20.

The second electromagnet assembly 40 is positioned within an interior of the housing 20 defined by the first 21 and second end portions 23 and the perimeter wall 27 of the housing 20. The second electromagnet assembly 40 is positioned adjacent the second end portion 23 of the housing 20.

The rod assembly 60 includes a rod member with a rod member first portion 62 and a rod member second portion 64. The rod member first portion 62 extends into the housing 20 through the rod aperture 24.

The moving electromagnet assembly 50 is coupled to the rod member first portion 62. The moving electromagnet assembly 50 is positioned within the housing 20.

The first electromagnet assembly 30 comprises an upper plate member 31, a lower plate member 33, a shaft portion 35, a conductive member 36, and a pair of conductive terminals 38.

The upper plate 31 is coupled to the first end portion 21 of the housing 20. The upper plate 31 and the lower plate 33 are in a substantially parallel spaced relationship. The shaft portion 35 extends between the upper plate 31 and the lower plate 33.

The shaft portion 35 includes an upper end and a lower end. The upper end is coupled to a medial portion of the upper plate member 31. The lower end is coupled to a medial portion of the lower plate member 33 such that the first electromagnet assembly 30 is fixedly positioned adjacent to the first end portion 21 of the housing 20.

The first end portion 21 of the housing 20 includes a pair of connecting apertures. The connecting apertures extend through the perimeter wall 27.

Each of the pair of conductive terminals 38 extends through an associated one of the pair of connecting apertures such that a first end of each of the pair of conductive terminals 38 is positioned within the interior of the housing 20, and a second end of each one of the pair of conductive terminals is positioned without the housing 20.

The conductive member 36 includes a conductive member first end and a conductive member second end. The conductive member first end is coupled with an associated first end of a first one of the pair of conductive terminals 38. The conductive member second end is coupled with an associated first end of a second one of the pair of conductive terminals 38 such that the first one of the pair of conductive terminals 38 is in electrical communication with the second one of the pair of conductive terminals 38.

The second electromagnet assembly 40 comprising an upper plate member 41, a lower plate member 43, a shaft portion 45, a conductive member 46, and a pair of conductive terminals 48.

The lower plate 43 is coupled to the second end portion 23 of the housing 20. The upper plate 41 and the lower plate 43 are in a substantially parallel spaced relationship. The shaft portion 45 extends between the upper plate 41 and the lower plate 43.

The shaft portion 45 includes an upper end and a lower end. The upper end is coupled to a, medial portion of the upper plate member 41. The lower end is coupled to a medial portion of the lower plate member 43 such that the second electromagnet assembly 40 is fixedly positioned adjacent to the second end portion 23 of the housing 20.

The second end portion 23 of the housing 20 includes a pair of connecting apertures. The connecting apertures extend through the perimeter wall 27.

Each of the pair of conductive terminals 48 extends through an associated one of the pair of connecting apertures such that a first end of each of the pair of conductive terminals 48 is positioned within the interior of the housing 20, and a second end of each one of the pair of conductive terminals 48 is positioned without the housing 20.

The conductive member 46 includes a conductive member first end and a conductive member second end. The conductive member first end is coupled with an associated first end of a first one of the pair of conductive terminals 48. The conductive member second end is coupled with an associated first end of a second one of the pair of conductive terminals 48 such that the first one of the pair of conductive terminals 48 is in electrical communication with the second one of the pair of conductive terminals 48.

The lower plate member 43 of the second electromagnet assembly 40 includes a lower rod aperture 44. The upper plate member 41 of the second electromagnet assembly 40 includes an upper rod aperture 42. The shaft portion 45 of the second electromagnet assembly 40 includes a shaft aperture.

The lower rod aperture 44, the upper rod aperture 42, and the shaft aperture each are aligned with the rod aperture 24 of the second end portion 23 of the housing 30 such that the rod member first portion 62 is slidably insertable into the interior of the housing 20.

The conductive member 36 of the first electromagnet assembly 30 includes a length wrapped around, an outside surface of the shaft portion 35. The conductive member 36 is for conducting an electrical current. The length of the conductive member 36 is wrapped around the shaft portion 35 such that a magnet flux is generated by the electrical current passing through the conductive member 36.

The conductive member 46 of the second electromagnet assembly 40 includes a length wrapped around an outside surface of the shaft portion 45. The conductive member 46 is for conducting an electrical current. The length of the conductive member 46 is wrapped around the shaft portion 45 such that a magnet flux is generated by the electrical current passing through the conductive member 46.

The upper 31 and lower plates 33 of the first electromagnet assembly 30 comprise a substantially ferrous material such that the upper 31 and lower plates 33 conduct a magnetic flux.

The upper 41 and lower plates 43 of the second electromagnet assembly 40 comprise a substantially ferrous material such that the upper 41 and lower plates 43 conduct a magnetic flux.

The current is conducted through the conductive member 36 of the first electromagnet assembly 30 is biased such that the lower plate 33 is magnetically charged to a first polarity.

The current is conducted through the conductive member 46 of the second electromagnet assembly 40 is biased such that the upper plate 41 is magnetically charged to a polarity opposite the first polarity of the lower plate 33 of the first electromagnet assembly 30.

In an embodiment the lower plate 33 of the first electromagnet assembly 30 is magnetically positively charged and the upper plate 41 of the second electromagnet assembly 40 is negatively charged.

The moving electromagnet assembly 50 includes an upper plate 51, a lower plate 53, a shaft portion 55, a conductive member 56, and a pair of connecting leads 57.

The upper plate 51 and the lower plate 53 are in a substantially parallel spaced relationship. The shaft portion 45 extends between the upper 51 and lower plates 53.

The shaft portion 55 includes an interior cavity defined by a perimeter wall. The shaft member 55 includes a connecting lead aperture.

Each of the upper 51 and lower plates 53 and the shaft portion 55 is coupled to the rod member first portion 62 such that sliding the rod member first portion 62 into and out of the interior of the housing 20 through the rod aperture 24 moves the moving electromagnet assembly 50 between the lower plate 33 of the first electromagnet assembly 30 and the upper plate 41 of the second electromagnet assembly 40.

The conductive member 56 of the moving electromagnet assembly 50 includes a first end, a second end, and a length. The length of the conductive member 56 is wrapped around the shaft portion 55.

The first and second ends of the conductive member 56 are positioned through the connecting lead aperture. The first end is coupled to a first one of the connecting leads 57. The second end is coupled to a second one of the connecting leads 57 such that the connecting leads 57 are in electrical communication through the conductive member 56.

The conductive member 56 of the moving electromagnet assembly 50 includes a length wrapped around an outside surface of the shaft portion 55. The conductive member 56 is for conducting an electrical current. The length of the conductive member 56 is wrapped around the shaft portion 55 such that a magnet flux is generated by the electrical current passing through the conductive member 56.

The upper 51 and lower plates 53 of the moving electromagnet assembly 50 comprise a substantially ferrous material such that the upper 51 and lower plates 53 conduct a magnetic flux.

A housing connector flange 25 has an aperture 26. The housing connector flange 25 is substantially cylindrical. The housing 20 includes a protrusion 22 extending from a top surface of the housing 20. The housing connector flange 25 is coupled to the protrusion 22 such that a longitudinal axis of the housing connector flange 25 is substantially perpendicular with a longitudinal axis of the housing 20. The housing connector flange 25 is designed for coupling the housing 20 to a frame of a vehicle.

The rod member second portion 64 is a rod flange. The rod flange 64 has an aperture 66. The rod flange 64 is substantially cylindrical. The rod flange 64 is coupled to the rod member first portion 62 such that a longitudinal axis of the rod flange 64 is substantially perpendicular with a longitudinal axis of the rod member first portion 62. The rod flange 64 is designed for coupling the rod assembly 60 to a control arm of a vehicle.

The rod flange 64 includes a pair of conductive terminals 58. Each of the conductive terminals 58 is electrically coupled to an associated one of a pair of connecting lead 57.

The rod member first portion 62 is substantially hollow. Each of the pair of connecting leads 57 is positioned in the rod member first portion 62.

The conductive members 36,46,56 of each of the first electromagnet assembly 30, second electromagnet assembly 40, and moving electromagnet assembly 50 are in electrical communication with a current source such that the lower plate 33 of the first electromagnet assembly 30 is magnetically charged to a first polarity. The upper plate 51 of the moving electromagnetic assembly 50 is magnetically charged to the same first polarity.

The upper plate 41 of the second electromagnetic assembly 40 is magnetically charged to a polarity opposed to the polarity of the lower plate 33 of the first electromagnet assembly 30. The lower plate 53 of the moving electromagnet assembly 50 is magnetically charged to the same polarity as the upper plate 41 of the second electromagnet 40. Thus the moving electromagnet assembly 50 is repelled by the lower plate 33 of the first electromagnet assembly 30 and the moving electromagnet assembly 50 is repelled by the upper plate 41 of the second electromagnet assembly 40 such that a sliding motion of the rod assembly 60 is damped by the magnetic flux of the electromagnet assemblies 30, 40, 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electromagnetic shock absorber comprising:

an housing, said housing having a first end portion and a second end portion, said housing having a perimeter wall extending from said first end portion to said second end portion, said second end portion having a rod aperture extending therethrough;

a first electromagnet assembly, said first electromagnet assembly being positioned within an interior of said housing defined by said first and second end portions and said perimeter wall of said housing, said first electromagnet assembly being positioned adjacent said first end portion of said housing;

a second electromagnet assembly, said second electromagnet assembly being positioned within an interior of said housing defined by said first and second end portions and said perimeter wall of said housing, said second electromagnet assembly being positioned adjacent said second end portion of said housing;

a rod assembly, said rod assembly having a rod member including an rod member first portion and a rod member second portion, said rod member first portion extending into said housing through said rod aperture;

a moving electromagnet assembly, said moving electromagnet assembly being coupled to said rod member first portion, said moving electromagnet assembly being positioned within said housing;

said moving electromagnet assembly having an upper plate, a lower plate, a shaft portion, a conductive member, and a pair of connecting leads;

said upper plate and said lower plate being in a fixed substantially parallel spaced relationship with respect to each other, said shaft portion extending between said upper and lower plates for holding said upper and lower plates in said fixed relationship;

said shaft portion having an interior cavity defined by a perimeter wall, said shaft member having a connecting lead aperture;

each of said upper and lower plates and said shaft portion being coupled to said rod member such that sliding said rod member into and out of said interior of said housing through said rod aperture moves said moving electromagnet assembly between a lower plate of said first electromagnet assembly and an upper plate of said second electromagnet assembly.

2. The electromagnetic shock absorber of claim 1, further comprising:

said first electromagnet assembly comprising an upper plate member, said lower plate member, a shaft portion, a conductive member, and a pair of conductive terminals;

said upper plate being coupled to said first end portion of said housing, said upper plate and said lower plate being in a substantially parallel spaced relationship, said shaft portion extending between said upper plate and said lower plate;

said shaft portion having an upper end and a lower end, said upper end being coupled to a medial portion of said upper plate member, said lower end being coupled to a medial portion of said lower plate member such that said first electromagnet assembly being fixedly positioned adjacent to said first end portion of said housing;

said first end portion of said housing having a pair of connecting apertures, said connecting apertures extending through said perimeter wall;

each of said pair of conductive terminals extending through an associated one of said pair of connecting apertures such that a first end of each of said pair of conductive terminals being positioned within said interior of said housing and a second end of each one of said pair of conductive terminals being positioned without said housing;

said conductive member having a conductive member first end and a conductive member second end, said conductive member first end being coupled with an associated first end of a first one of said pair of conductive terminals, said conductive member second end being coupled with an associated first end of a second one of said pair of conductive terminals such that said first one of said pair of conductive terminals being in electrical communication with said second one of said pair of conductive terminals.

3. The electromagnetic shock absorber of claim 2, further comprising:

said second electromagnet assembly comprising said upper plate member, a lower plate member, a shaft portion, a conductive member, and a pair of conductive terminals;

said lower plate being coupled to said second end portion of said housing, said upper plate and said lower plate being in a substantially parallel spaced relationship, said shaft portion extending between said upper plate and said lower plate;

said shaft portion having an upper end and a lower end, said upper end being coupled to a medial portion of said upper plate member, said lower end being coupled to a medial portion of said lower plate member such that said second electromagnet assembly being fixedly positioned adjacent to said second end portion of said housing;

said second end portion of said housing having a pair of connecting apertures, said connecting apertures extending through said perimeter wall;

each of said pair of conductive terminals extending through an associated one of said pair of connecting apertures such that a first end of each of said pair of conductive terminals being positioned within said interior of said housing and a second end of each one of said pair of conductive terminals being positioned without said housing;

said conductive member having a conductive member first end and a conductive member second end, said conductive member first end being coupled with an associated first end of a first one of said pair of conductive terminals, said conductive member second end being coupled with an associated first end of a second one of said pair of conductive terminals such that said first one of said pair of conductive terminals being in electrical communication with said second one of said pair of conductive terminals.

4. The electromagnetic shock absorber of claim 3, further comprising:

said lower plate member of said second electromagnet assembly having a lower rod aperture extending therethrough;

said upper plate member of said second electromagnet assembly having an upper rod aperture extending therethrough;

said shaft portion of said second electromagnet assembly having a shaft aperture extending therethrough;

said lower rod aperture, said upper rod aperture, and said shaft aperture each being aligned with said rod aperture of said second end portion of said housing such that said rod member is slidably insertable into said interior of said housing.

5. The electromagnetic shock absorber of claim 3, further comprising:

said conductive member of said first electromagnet assembly having a length wrapped around an outside surface of said shaft portion, said conductive member being for conducting an electrical current, said length of said conductive member being wrapped around said shaft portion such that a magnet flux is generated by said the electrical current passing through said conductive member;

said conductive member of said second electromagnet assembly having a length wrapped around an outside surface of said shaft portion, said conductive member being for conducting an electrical current, said length of said conductive member being wrapped around said shaft portion such that a magnet flux is generated by said the electrical current passing through said conductive member.

6. The electromagnetic shock absorber of claim 5, further comprising:

said upper and lower plates of said first electromagnet assembly comprising substantially ferrous material such that said upper and lower plates conduct a magnetic flux;

said upper and lower plates of said second electromagnet assembly comprising substantially ferrous material such that said upper and lower plates conduct a magnetic flux.

7. The electromagnetic shock absorber of claim 6, further comprising:

the current being conducted through said conductive member of said first electromagnet assembly is biased such that said lower plate being magnetically charged to a first polarity;

the current being conducted through said conductive member of said second electromagnet assembly is biased such that said upper plate being magnetically charged to a polarity opposite the first polarity of the lower plate of said first electromagnet assembly.

8. The electromagnetic shock absorber of claim 7, further comprising:

wherein said lower plate of said first electromagnet assembly being magnetically positively charged and said upper plate of said second electromagnet assembly being negatively charged.

9. The electromagnetic shock absorber of claim 1, further comprising:

said conductive member of said moving electromagnet assembly having a first end, a second end, and a length, said length of said conductive member being wrapped around said shaft portion;

said first and second ends of said conductive member being positioned through said connecting lead aperture, said first end being coupled to a first one of said connecting leads, said second end being coupled to a second one of said connecting leads such that said connecting leads being in electrical communication through said conductive member.

10. The electromagnetic shock absorber of claim 9, further comprising:

said conductive member of said moving electromagnet assembly having a length wrapped around an outside surface of said shaft portion, said conductive member being for conducting an electrical current, said length of said conductive member being wrapped around said shaft portion such that a magnet flux is generated by said the electrical current passing through said conductive member.

11. The electromagnetic shock absorber of claim 10, further comprising:

said upper and lower plates of said moving electromagnet assembly comprising substantially ferrous material such that said upper and lower plates conduct a magnetic flux.

12. The electromagnetic shock absorber of claim 1, further comprising:

a housing connector flange; said housing connector flange having an aperture extending therethrough, said housing connector flange being substantially cylindrical;

said housing having a protrusion extending from a top surface of said housing, said housing connector flange being coupled to said protrusion such that a longitudinal axis of said housing connector flange being substantially perpendicular with a longitudinal axis of said housing;

said housing connector flange being adapted for coupling said housing to a frame of a vehicle.

13. The electromagnetic shock absorber of claim 1, further comprising:

said rod member second portion comprising a rod flange, said rod flange having an aperture extending therethrough, said rod flange being substantially cylindrical, said rod flange being coupled to said rod first member first portion such that a longitudinal axis of said rod flange being substantially perpendicular with a longitudinal axis of said rod member first portion;

said rod flange being adapted for coupling said rod member to a control arm of a vehicle.

14. The electromagnetic shock absorber of claim 13, further comprising:

said rod flange having a pair of conductive terminals, each of said conductive terminals being electrically coupled to an associated one of a pair of connecting lead;

said rod member first portion being substantially hollow, each of said pair of connecting leads being positioned in said rod member first portion.

15. An electromagnetic shock absorber comprising:

an housing, said housing having a first end portion and a second end portion, said housing having a perimeter wall extending from said first end portion to said second end portion, said second end portion having a rod aperture extending therethrough;

first electromagnet assembly, said first electromagnet assembly being positioned within an interior of said housing defined by said first and second end portions and said perimeter wall of said housing, said first electromagnet assembly being positioned adjacent said first end portion of said housing;

a second electromagnet assembly, said second electromagnet assembly being positioned within an interior of said housing defined by said first and second end portions and said perimeter wall of said housing, said second electromagnet assembly being positioned adjacent said second end portion of said housing;

a rod assembly, said rod assembly having a rod member including an rod member first portion and a rod member second portion, said rod member extending into said housing through said rod aperture;

a moving electromagnet assembly, said moving electromagnet assembly being coupled to said rod member first portion, said moving electromagnet assembly being positioned within said housing;

said first electromagnet assembly comprising an upper plate member, a lower plate member, a shaft portion, a conductive member, and a pair of conductive terminals;

said upper plate being coupled to said first end portion of said housing, said upper plate and said lower plate being in a substantially parallel spaced relationship, said shaft portion extending between said upper plate and said lower plate;

said shaft portion having an upper end and a lower end, said upper end being coupled to a medial portion of said upper plate member, said lower end being coupled to a medial portion of said lower plate member such that said first electromagnet assembly being fixedly positioned adjacent to said first end portion of said housing;

said first end portion of said housing having a pair of connecting apertures, said connecting apertures extending through said perimeter wall;

each of said pair of conductive terminals extending through an associated one of said pair of connecting apertures such that a first end of each of said pair of conductive terminals being positioned within said interior of said housing and a second end of each one of said pair of conductive terminals being positioned without said housing;

said conductive member having a conductive member first end and a conductive member second end, said conductive member first end being coupled with an associated first end of a first one of said pair of conductive terminals, said conductive member second end being coupled with an associated first end of a second one of said pair of conductive terminals such that said first one of said pair of conductive terminals being in electrical communication with said second one of said pair of conductive terminals;

said second electromagnet assembly comprising an upper plate member, a lower plate member, a shaft portion, a conductive member, and a pair of conductive terminals;

said lower plate being coupled to said second end portion of said housing, said upper plate and said lower plate being in a substantially parallel spaced relationship, said shaft portion extending between said upper plate and said lower plate;

said shaft portion having an upper end and a lower end, said upper end being coupled to a medial portion of said upper plate member, said lower end being coupled to a medial portion of said lower plate member such that said second electromagnet assembly being fixedly positioned adjacent to said second end portion of said housing;

said second end portion of said housing having a pair of connecting apertures, said connecting apertures extending through said perimeter wall;

each of said pair of conductive terminals extending through an associated one of said pair of connecting apertures such that a first end of each of said pair of conductive terminals being positioned within said interior of said housing and a second end of each one of said pair of conductive terminals being positioned without said housing;

said conductive member having a conductive member first end and a conductive member second end, said conductive member first end being coupled with an associated first end of a first one of said pair of conductive terminals, said conductive member second end being coupled with an associated first end of a second one of said pair of conductive terminals such that said first one of said pair of conductive terminals being in electrical communication with said second one of said pair of conductive terminals;

said lower plate member of said second electromagnet assembly having a lower rod aperture extending therethrough;

said upper plate member of said second electromagnet assembly having an upper rod aperture extending therethrough;

said shaft portion of said second electromagnet assembly having a shaft aperture extending therethrough;

said lower rod aperture, said upper rod aperture, and said shaft aperture each being aligned with said rod aperture of said second end portion of said housing such that said rod member is slidably insertable into said interior of said housing;

said conductive member of said first electromagnet assembly having a length wrapped around an outside surface of said shaft portion, said conductive member being for conducting an electrical current, said length of said conductive member being wrapped around said shaft portion such that a magnet flux is generated by said the electrical current passing through said conductive member;

said conductive member of said second electromagnet assembly having a length wrapped around an outside surface of said shaft portion, said conductive member being for conducting an electrical current, said length of said conductive member being wrapped around said shaft portion such that a magnet flux is generated by said the electrical current passing through said conductive member;

said upper and lower plates of said first electromagnet assembly comprising substantially ferrous material such that said upper and lower plates conduct a magnetic flux;

said upper and lower plates of said second electromagnet assembly comprising substantially ferrous material such that said upper and lower plates conduct a magnetic flux;

the current being conducted through said conductive member of said first electromagnet assembly is biased such that said lower plate being magnetically charged to a first polarity;

the current being conducted through said conductive member of said second electromagnet assembly is biased such that said upper plate being magnetically charged to a polarity opposite the first polarity of the lower plate of said first electromagnet assembly;

wherein said lower plate of said first electromagnet assembly being magnetically positively charged and said upper plate of said second electromagnet assembly being negatively charged;

said moving electromagnet assembly having an upper plate, a lower plate, a shaft portion, a conductive member, and a pair of connecting leads;

said upper plate and said lower plate being in a fixed substantially parallel spaced relationship with respect to each other, said shaft portion extending between said upper and lower plates for holding said upper and lower plates in said fixed relationship;

said shaft portion having an interior cavity defined by a perimeter wall, said shaft member having a connecting lead aperture;

each of said upper and lower plates and said shaft portion being coupled to said rod member such that sliding said rod member into and out of said interior of said housing through said rod aperture moves said moving electromagnet assembly between said lower plate of said first electromagnet assembly and said upper plate of said second electromagnet assembly;

said conductive member of said moving electromagnet assembly having a first end, a second end, and a length, said length of said conductive member being wrapped around said shaft portion;

said first and second ends of said conductive member being positioned through said connecting lead aperture, said first end being coupled to a first one of said connecting leads, said second end being coupled to a second one of said connecting leads such that said connecting leads being in electrical communication through said conductive member;

said conductive member of said moving electromagnet assembly having a length wrapped around an outside surface of said shaft portion, said conductive member being for conducting an electrical current, said length of said conductive member being wrapped around said shaft portion such that a magnet flux is generated by said the electrical current passing through said conductive member;

said upper and lower plates of said moving electromagnet assembly comprising substantially ferrous material such that said upper and lower plates conduct a magnetic flux;

a housing connector flange; said housing connector flange having an aperture extending therethrough, said housing connector flange being substantially cylindrical;

said said housing having a protrusion extending from a top surface of said housing, said housing connector flange being coupled to said protrusion such that a longitudinal axis of said housing connector flange being substantially perpendicular with a longitudinal axis of said housing;

said housing connector flange being adapted for coupling said housing to a frame of a vehicle;

said rod member second portion comprising a rod flange, said rod flange having an aperture extending therethrough, said rod flange being substantially cylindrical, said rod flange being coupled to said rod first member first portion such that a longitudinal axis of said rod flange being substantially perpendicular with a longitudinal axis of said rod member first portion;

said rod flange being adapted for coupling said rod member to a control arm of a vehicle;

said rod flange having a pair of conductive terminals, each of said conductive terminals being electrically coupled to an associated one of a pair of connecting lead;

said rod member first portion being substantially hollow, each of said pair of connecting leads being positioned in said rod member first portion.

16. The electromagnetic shock absorber of claim 15 further comprising:

said conductive members of each of said first electromagnet assembly, second electromagnet assembly, and moving electromagnet assembly being in electrical communication with a current source such that said lower plate of said first electromagnet assembly being magnetically charged to a first polarity, said upper plate of said moving electromagnetic assembly being magnetically charged to the same first polarity;

said upper plate of said second electromagnetic assembly being magnetically charged to a polarity opposed to the polarity of said lower plate of said first electromagnet assembly, said lower plate of said moving electromagnet assembly being magnetically charged to the same polarity as said upper plate of said second electromagnet, whereby said moving electromagnet being repelled by said lower plate of said first electromagnet assembly and said moving electromagnet being repelled by said upper plate of said second electromagnet assembly such that a sliding motion of said rod assembly being damped by the magnetic flux of said electromagnet assemblies.

* * * * *